United States Patent [19]

Sharp

[11] Patent Number: 5,171,057
[45] Date of Patent: Dec. 15, 1992

[54] TRUCK AIR DUCTING APPARATUS

[76] Inventor: Donald R. Sharp, 1459 E. Hildalgo Cir., Roseville, Calif. 95678

[21] Appl. No.: 797,375

[22] Filed: Nov. 25, 1991

[51] Int. Cl.$^5$ ............................................. B62D 35/00
[52] U.S. Cl. ..................................... 296/180.4; 296/91
[58] Field of Search ...................... 296/180.4, 180.1, 91

[56] References Cited

U.S. PATENT DOCUMENTS

| | | | |
|---|---|---|---|
| 3,010,754 | 11/1961 | Shumaker | 296/91 |
| 3,807,787 | 4/1974 | Gotz | 296/91 |
| 3,960,402 | 6/1976 | Keck | 296/180.4 |
| 4,320,920 | 3/1982 | Goudey | 296/180.4 |

Primary Examiner—Robert R. Song
Attorney, Agent, or Firm—Leon Gilden

[57] ABSTRACT

A truck body includes a rear wall, with the rear wall arranged to receive a plurality of "L" shaped air duct members, each including a first and second intercommunicating pneumatic conduit to direct air from side walls of the truck body to the rear wall to enhance cleaning of the rear wall of the truck minimizing separation of vacuum at a trailing surface of the truck to increasing resistance of a truck resulting in decreased fuel economy.

3 Claims, 4 Drawing Sheets

U.S. Patent  Dec. 15, 1992  Sheet 1 of 4  5,171,057
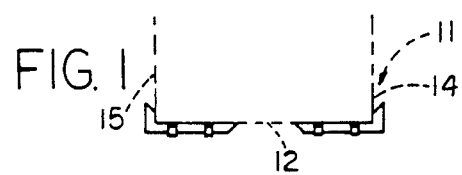
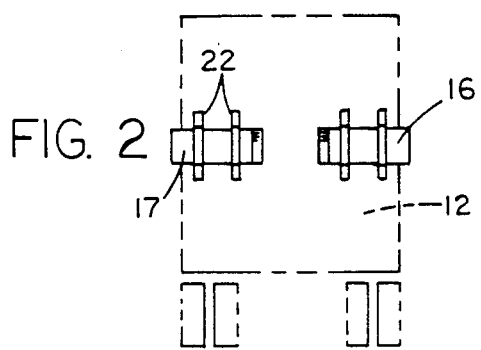
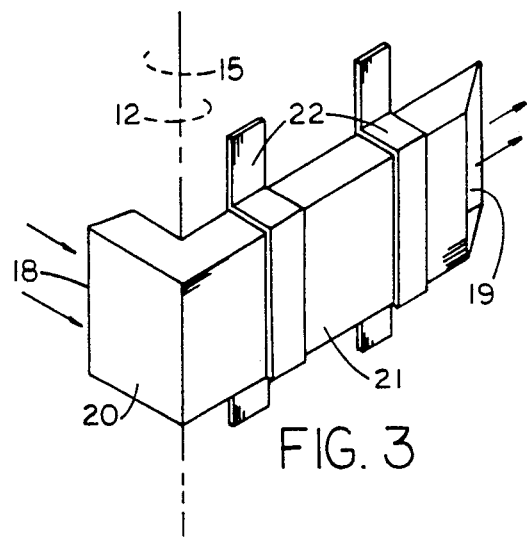
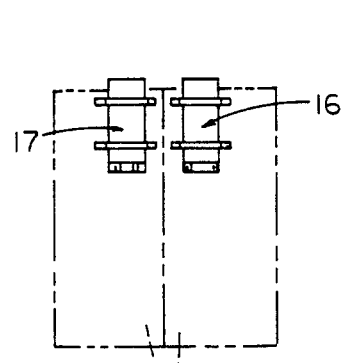
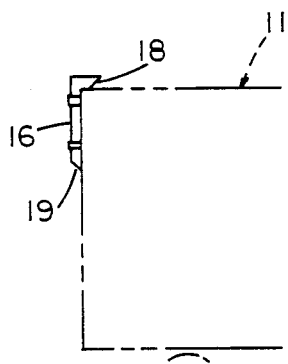
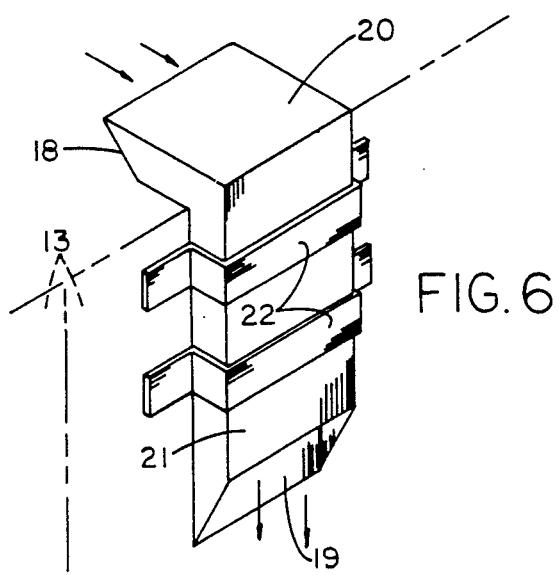

5,171,057

TRUCK AIR DUCTING APPARATUS

BACKGROUND OF THE INVENTION

1. Field of the Invention

The field of invention relates to air ducting apparatus, and more particularly pertains to a new and improved truck air ducting apparatus wherein the same is arranged to direct air to a rear surface of a truck to minimize vacuum and drag resistance of the truck during use.

2. Description of the Prior Art

Various air ducting apparatus is utilized throughout the prior art to direct air to a rear surface of a vehicle, and such is exemplified in U.S. Pat. No. 4,838,603 to Masoero, et al., wherein air ducts mounted at corner portions of a vehicle are directed to prevent associated rear tail lights from becoming dirty during use of the vehicle.

U.S. Pat. No. 4,966,407 to Lusk and U.S. Pat. No. 4,703,970 to Gorka are examples of air directing members mounted relative to a truck to deflect air.

U.S. Pat. No. 4,867,397 to Pamadi, et al., sets forth a vehicle aerodynamic system wherein a plurality of vertical panels are mounted to a forward surface of the vehicle to enhance transition flow of air about the vehicle improving its aerodynamics.

As such, it may be appreciated that there continues to be a need for a new and improved truck air ducting apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of air ducting apparatus now present in the prior art, the present invention provides a truck air ducting apparatus wherein the same is arranged to direct a column of air to a rear surface of a truck trailer structure minimizing vacuum creation at the rear surface enhancing aerodynamic efficiency of the truck in use. As such, the general purpose of the present invention, which will be described subsequently in greater detail, is to provide a new and improved truck air ducting apparatus which has all the advantages of the prior art air ducting apparatus and none of the disadvantages.

To attain this, the present invention provides a truck body including a rear wall, with the rear wall arranged to receive a plurality of "L" shaped air duct members, each including a first and second intercommunicating pneumatic conduit to direct air from side walls of the truck body to the rear wall to enhance cleaning of the rear wall of the truck minimizing separation of vacuum at a trailing surface of the truck to increasing resistance of a truck resulting in decreased fuel economy.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved truck air ducting apparatus which has all the advantages of the prior art air ducting apparatus and none of the disadvantages.

It is another object of the present invention to provide a new and improved truck air ducting apparatus which may be easily and efficiently manufactured and marketed.

It is a further object of the present invention to provide a new and improved truck air ducting apparatus which is of a durable and reliable construction.

An even further object of the present invention is to provide a new and improved truck air ducting apparatus which is susceptible of a low cost of manufacture with regard to both materials and labor, and which accordingly is then susceptible of low prices of sale to the consuming public, thereby making such truck air ducting apparatus economically available to the buying public.

Still yet another object of the present invention is to provide a new and improved truck air ducting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the invention mounted to a rear wall of a truck surface.

FIG. 2 is an orthographic view, taken in elevation, of the emission mounted to the truck rear surface.

FIG. 3 is an enlarged isometric illustration of a duct member mounted to the truck rear surface.

FIG. 4 is an orthographic rear view of the apparatus mounted to door portions of a truck vehicle.

FIG. 5 is an orthographic side view of the duct portions as set forth in FIG. 4.

FIG. 6 is an isometric enlarged illustration of the truck air ducting apparatus as set forth in the FIGS. 4 and 5.

DESCRIPTION OF THE PREFERRED EMBODIMENT

Figure 7:
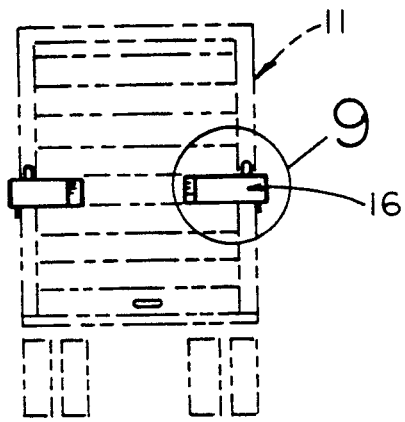
FIG. 7 is an orthographic rear view of the invention mounted in a pivotal relationship relative to a truck rear wall.

With reference now to the drawings, and in particular to FIGS. 1 to 15 thereof, a new and improved truck air ducting apparatus embodying the principles and concepts of the present invention and generally designated by the reference numeral 10 will be described.

More specifically, the truck air ducting apparatus 10 of the instant invention is arranged for mounting to a truck vehicle 11 that includes a truck trailer, with the trailer including a trailer rear wall 12, with the trailer rear wall 12 optionally being provided with doors 13, of a type such as illustrated in FIG. 4. The trailer is defined by trailer first and second spaced side walls 14 and 15. A respectively first and second "L" shaped pneumatic conduit 16 and 17 are mounted to the rear wall 12, with each conduit including an entrance opening 18 and exit opening 19, with the entrance opening 18 directed along a side wall 14 and 15 and the exit opening 19 directed to the rear wall 12 to effect pressurizing of the rear wall minimizing vacuum creation during use of the vehicle. The exit opening 19 and the associated draft of pneumatic air directed therethrough further aids in the cleaning and minimizing of dust accumulated to the rear wall in traverse along the highway by the associated truck vehicle 11. The pneumatic conduit first tube portion 20 is orthogonally oriented relative to a conduit second tube portion 21 to define the "L" shaped conduit structure, with the first tube portion 20 directed along a side wall, with the second tube portion 21 directed along the rear wall 12. Spaced "U" shaped mounting brackets 22 are mounted along the second tube portion 21 for securement of the "L" shaped pneumatic conduit to the truck structure. In the event of use of doors 13, the "L" shaped pneumatic conduits 16 and 17 (see FIG. 4) are mounted one to each door, whereupon opening of each door effects opening and movement of the pneumatic conduit therewith.

Figure 8:
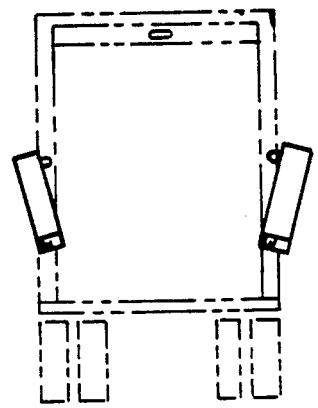
FIG. 8 is an orthographic rear view of the duct members in a pivoted relationship to permit opening of the truck rear door.
Figure 9:
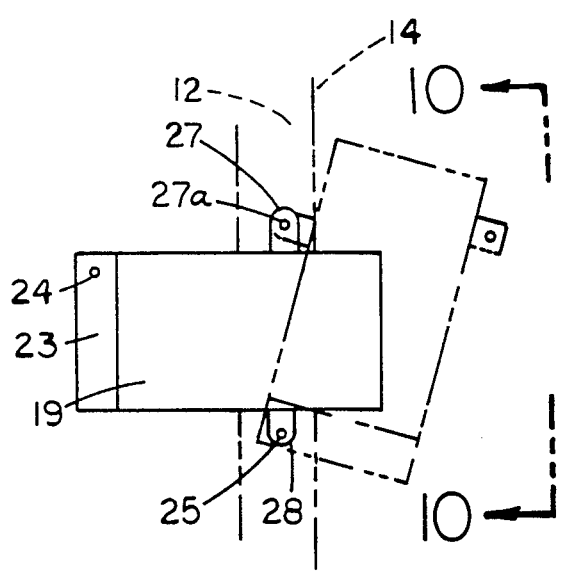
FIG. 9 is an orthographic view taken of section 9 in FIG. 7.
Figure 10:
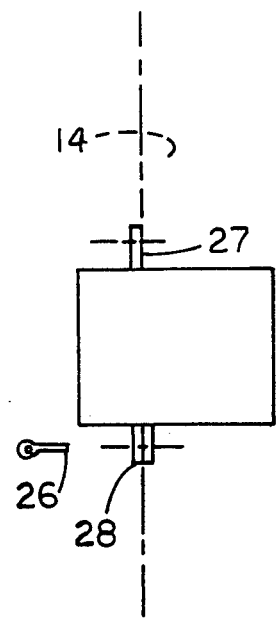
FIG. 10 is an orthographic view, taken along the lines 10—10 of FIG. 9 in the direction indicated by the arrows.
Figure 11:
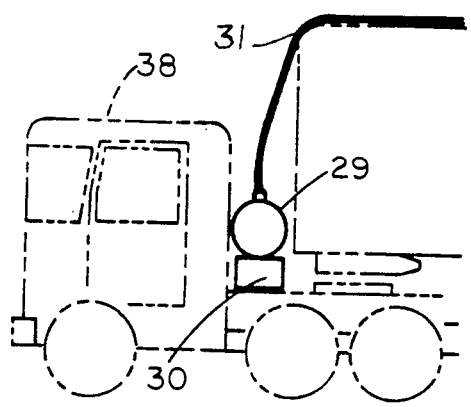
FIG. 11 is an orthographic side view of the invention utilizing a fluid cleaning system.
Figure 12:
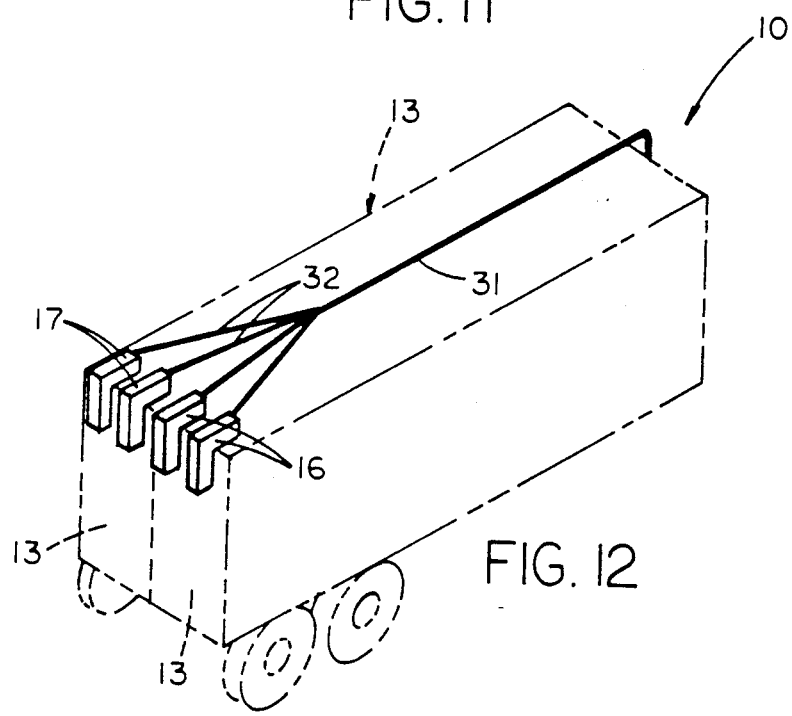
FIG. 12 is an isometric illustration of the truck trailer utilizing the fluid conduit structure associated therewith.
Figure 13:
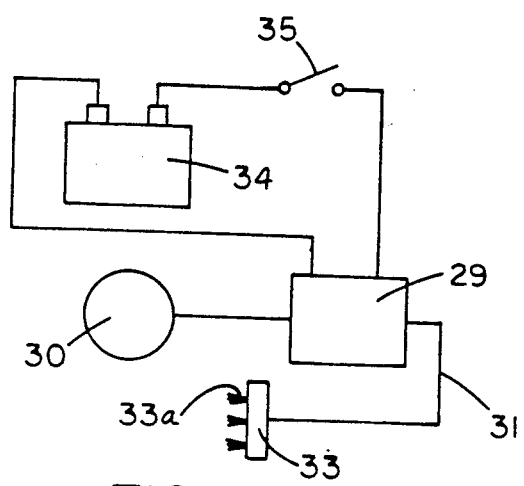
FIG. 13 is a diagrammatic illustration of the fluid system utilized by the invention, as set forth in the FIGS. 11 and 12.
Figure 14:
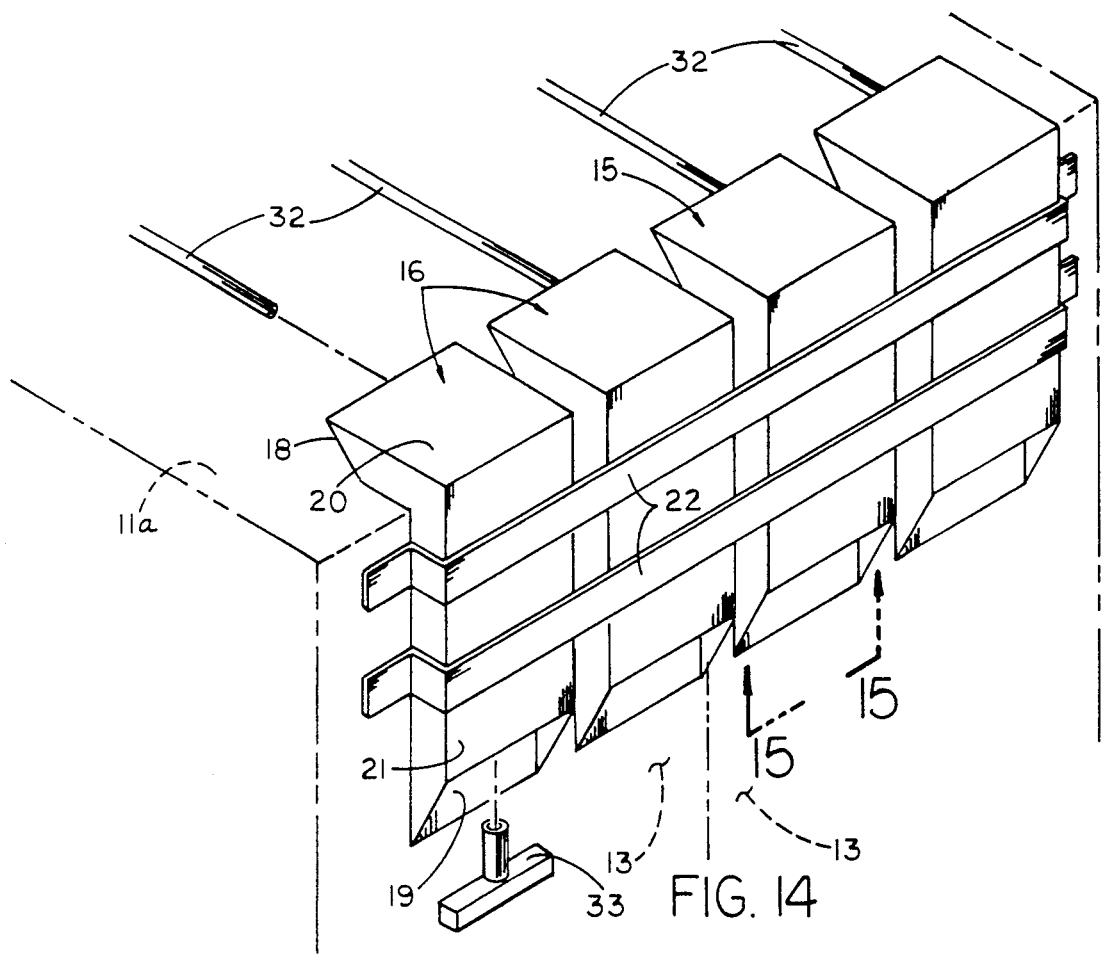
FIG. 14 is an isometric illustration of the duct members mounted to the truck rear wall, as set forth in FIG. 12.
Figure 15:
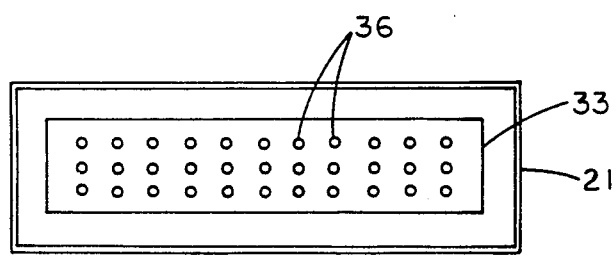
FIG. 15 is an orthographic view, taken along the lines 15—15 of FIG. 14 in the direction indicated by the arrows.

In the event of a sliding door, such as illustrated in the FIGS. 7 and 8 on the rear wall 12, the "L" shaped pneumatic conduits 16 and 17 are pivotally mounted to the rear wall adjacent the sliding door and include a first flange 27 and a second flange 28 fixedly to the second tube portion 21 on both sides thereof. A first flange pivot axle 27a directed through the first flange 27 is mounted to the rear wall adjacent the door structure, as illustrated in FIG. 9. A second tube portion bottom wall 23 at the exit opening 19 includes a bottom wall aperture 24 to receive a lock pin 26 therethrough that initially is directed through the second flange 28 into a truck trailer aperture 25. Upon pivotment of the conduit, as illustrated in FIG. 9, the lock pin 26 is removed and directed through the bottom wall aperture 24 into the truck trailer aperture 25 to displace the associated pneumatic conduit relative to the door to permit ease of access to the door in use.

The apparatus as depicted in the FIGS. 11-15 illustrates the first and second "L" shaped pneumatic conduits 16 and 17 mounted fixedly to the rear wall 12 above the doors 13, including the brackets of "U" shaped configuration 22 spanning the conduits 15 and 16 above the conduits relative to the rear wall 12. The first conduit portion 20 is mounted to the trailer vehicle roof 11a of the vehicle 38 (see FIG. 11) includes a pump 29 mounted thereto in communication with a fluid reservoir 30. The fluid reservoir 30 includes a cleansing fluid therewithin, with the fluid conduit 31 directed from the pump 29 over the trailer roof 11a utilizing a plurality of feed lines 32 from the fluid conduit 31 to direct a feed line 32 to each individual "L" shaped pneumatic conduit, where within each pneumatic conduit second tube portion 21, a spray head 33 is positioned (see FIGS. 14 and 15). Each spray head includes a matrix of spray bores 36 directed through the spray head in fluid communication with the associated feed line and fluid conduits 32 and 31 respectively. The spray head 33 mounted within the second tube portion 21 permits air flow thereabout and further permits periodic cleaning of the rear wall 12 and associated doors 13 as desired by an operator.

The vehicular battery 34 in cooperation with a switch 35 directs application of fluid 33a (see FIG. 13) from each spray head for dispersal along the associated rear wall surface 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as being new and desired to be protected by Letters Patent of the United States is as follows:

1. A truck air ducting apparatus, comprising in combination,
    a truck vehicle, the truck vehicle including a truck trailer, with the truck trailer including a trailer rear wall, a trailer roof, and spaced trailer respective first and second side walls, and
    further including a plurality of "L" shaped pneumatic conduits fixedly mounted to the trailer roof and the trailer rear wall, and
    each "L" shaped pneumatic conduit includes a first tube portion contiguous with the trailer roof, and a second tube portion contiguous with the trailer rear wall, and
    a plurality of "U" shaped mounting brackets positioned overlying the "L" shaped pneumatic conduits fixedly mounted to the trailer rear wall.

2. An apparatus as set forth in claim 1 including a tractor tow vehicle mounted to the trailer, wherein the tractor vehicle includes a fluid reservoir, the fluid reservoir including a cleansing fluid contained therewithin, and a pump in fluid communication with the reservoir, and a fluid conduit mounted to the pump, and the fluid conduit directed over the trailer, with the fluid conduit including a plurality of feed lines, each feed line of said plurality of feed lines directed into a respective "L" shaped pneumatic conduit into the first tube portion of each pneumatic conduit.

3. An apparatus as set forth in claim 2 wherein each pneumatic conduit further includes a spray head mounted within the second tube portion, the spray head in fluid communication with the feed conduit directed into the first tube portion, and the spray head including a matrix of spray bores directed through the spray head, and the second tube portion including an exit opening, the first tube portion including an entrance opening, the feed conduit directed through the entrance opening, and the spray bores projecting in alignment with the exit opening adjacent the trailer rear wall.

* * * * *